US010502169B2

(12) United States Patent
Meek et al.

(10) Patent No.: US 10,502,169 B2
(45) Date of Patent: Dec. 10, 2019

(54) FUEL INJECTOR

(71) Applicants: WESTPORT POWER INC., Vancouver (CA); DELPHI INTERNATIONAL OPERATIONS LUXEMBOURG S.À.R.L., Bascharage (LU)

(72) Inventors: George A. Meek, Lydney (GB); Lukhbir Panesar, Feltham (GB)

(73) Assignee: WESTPORT POWER INC., Vancouver (CA)

( * ) Notice: Subject to any disclaimer, the term of this patent is extended or adjusted under 35 U.S.C. 154(b) by 0 days.

(21) Appl. No.: 15/996,090

(22) Filed: Jun. 1, 2018

(65) Prior Publication Data

US 2018/0274506 A1 Sep. 27, 2018

Related U.S. Application Data

(63) Continuation of application No. 14/892,985, filed as application No. PCT/CA2014/050470 on May 21, 2014, now Pat. No. 10,006,422.

(30) Foreign Application Priority Data

May 21, 2013 (GB) .................................. 1309124.4

(51) Int. Cl.
*F02M 43/04* (2006.01)
*F02D 19/06* (2006.01)
(Continued)

(52) U.S. Cl.
CPC ......... *F02M 43/04* (2013.01); *F02D 19/0694* (2013.01); *F02D 19/10* (2013.01);
(Continued)

(58) Field of Classification Search
CPC ...... F02M 43/04; F02M 47/027; F02M 61/10; F02M 61/14; F02M 61/16;
(Continued)

(56) References Cited

U.S. PATENT DOCUMENTS

| 9,422,899 B2 * | 8/2016 | Kim ...................... F02M 43/04 |
| 2007/0040053 A1 | 2/2007 | Date |

(Continued)

FOREIGN PATENT DOCUMENTS

| CN | 1075777 A | 9/1993 |
| EP | 0 546 985 A1 | 6/1993 |

(Continued)

OTHER PUBLICATIONS

Chinese First Office Action, dated Jul. 19, 2017, for Chinese Application No. 201480028835.6, 12 pages. (with English Translation).

(Continued)

*Primary Examiner* — Joseph J Dallo
*Assistant Examiner* — Yi-Kai Wang
(74) *Attorney, Agent, or Firm* — Seed IP Law Group LLP

(57) ABSTRACT

A fuel injector for an internal combustion engine is disclosed. The fuel injector is installable in a cylinder head bore of a cylinder head of the engine and has a body region arranged to be received within the cylinder head bore, and a head region arranged to extend outside the cylinder head bore to protrude from the cylinder head when the injector is installed in the cylinder head bore. The injector includes a first valve needle arranged to control the injection of a gaseous fuel from a first outlet, a second valve needle arranged to control the injection of a liquid fuel from a second outlet, a gaseous fuel inlet for admitting the gaseous fuel to the injector, and a liquid fuel inlet port for admitting the liquid fuel to the injector. The gaseous fuel inlet is (Continued)

disposed in the body region of the injector, and the liquid fuel inlet port is disposed in the head region of the injector. The injector can also include an internal accumulator volume so that an external fuel rail is not necessary.

20 Claims, 4 Drawing Sheets

(51) Int. Cl.
*F02D 19/10* (2006.01)
*F02M 47/02* (2006.01)
*F02M 63/00* (2006.01)
*F02M 61/10* (2006.01)
*F02M 61/14* (2006.01)
*F02M 61/16* (2006.01)
*F02M 45/08* (2006.01)
*F02M 55/02* (2006.01)

(52) U.S. Cl.
CPC .......... *F02M 47/027* (2013.01); *F02M 61/10* (2013.01); *F02M 61/14* (2013.01); *F02M 61/16* (2013.01); *F02M 63/0015* (2013.01); *F02M 63/0064* (2013.01); *F02M 45/086* (2013.01); *F02M 55/025* (2013.01); *F02M 2200/40* (2013.01); *F02M 2200/857* (2013.01); *Y02T 10/36* (2013.01)

(58) Field of Classification Search
CPC .......... F02M 63/0015; F02M 63/0064; F02M 45/086; F02M 55/025; F02M 2200/40; F02M 2200/857; F02D 19/0694; F02D 19/10; Y02T 10/36
USPC ........................................................ 123/470
See application file for complete search history.

(56) References Cited

U.S. PATENT DOCUMENTS

| 2007/0199539 | A1 | 8/2007 | Lennox et al. | |
|---|---|---|---|---|
| 2009/0134246 | A1* | 5/2009 | Cooke | F02D 19/081 239/533.12 |
| 2010/0199948 | A1 | 8/2010 | Rogak et al. | |
| 2012/0318226 | A1* | 12/2012 | Stone | F02B 25/04 123/1 A |
| 2013/0047964 | A1* | 2/2013 | Kim | F02M 63/008 123/478 |
| 2013/0081593 | A1 | 4/2013 | Coldren | |
| 2013/0098333 | A1 | 4/2013 | Kim et al. | |
| 2014/0091159 | A1* | 4/2014 | Brown | F02M 63/00 239/398 |

FOREIGN PATENT DOCUMENTS

| EP | 0 778 410 A1 | 6/1997 |
|---|---|---|
| EP | 2 060 774 A1 | 5/2009 |
| EP | 2 508 742 A2 | 10/2012 |
| EP | 2 868 911 A1 | 5/2015 |
| WO | 00/15956 A1 | 3/2000 |
| WO | 2012/171119 A1 | 12/2012 |
| WO | 2012/177478 A2 | 12/2012 |
| WO | 2013/033136 A1 | 3/2013 |
| WO | 2013/056347 A1 | 4/2013 |

OTHER PUBLICATIONS

Chinese Search Report, dated Jul. 19, 2017, for Chinese Application No. 201480028835.6, 4 pages. (with English Translation).
Extended European Search Report, dated Nov. 25, 2016, for European Application No. 14800820.4-1603, 7 pages.

* cited by examiner

FUEL INJECTOR

FIELD OF THE INVENTION

The present invention relates to a fuel injector suitable for controlling the delivery of two different fuels into an internal combustion engine, and an internal combustion engine having a fuel injection system including one or more such injectors. In particular, but not exclusively, the invention relates to a fuel injector and a fuel injection system suitable for injecting a gaseous fuel and a liquid fuel.

BACKGROUND TO THE INVENTION

Internal combustion engines for heavy-duty and industrial applications are typically fuelled by diesel. However, the use of natural gas as an alternative to diesel is of increasing interest. Natural gas is relatively abundant and relatively cheap, and can, in principle, provide similar levels of power to diesel whilst producing lower particulate and nitrogen oxide (NOx) emissions.

Natural gas can be used in place of diesel to fuel a compression-ignition engine, in which combustion of the fuel occurs as a result of compression of the air-fuel mixture in the cylinder. However, because natural gas has a higher auto-ignition temperature than diesel, it can be necessary to initiate combustion with a pilot injection of diesel fuel before introducing the natural gas to the combustion chamber.

In one type of natural gas-powered engine, known as a high-pressure direct injection (HPDI) engine, both natural gas and diesel are injected directly into the combustion chamber. Due to the space constraints in an engine cylinder head, it is desirable to inject both fuels using one fuel injector per cylinder. This requires a fuel injector that is specially adapted to keep the two fuels separate within the injector, and to deliver independently the respective fuel at the appropriate time.

One such 'dual fuel' injector is described in International Patent Application Publication No. WO 00/15956. In this example, a fuel injector with a concentric twin nozzle arrangement is provided. Inner and outer valve needles are engageable at their lower ends with respective valve seats to control the flow of fuel through respective inner and outer sets of outlets. The outer valve needle controls the injection of natural gas through the outer set of outlets, and the inner valve needle controls the injection of diesel through the inner set of outlets. The outer valve needle is tubular to accommodate the inner valve needle, and the inner set of outlets is formed at a tip of the outer valve needle.

The inner and outer valve needles are controlled independently by two electromagnetic control valves, which are configured to control the pressure of a control fluid (normally diesel fuel) within respective control chambers for the inner and outer valve needles. The control chambers receive the upper ends of the respective needles, so that changing the pressure of the control fluid in each control chamber changes the downward (closing) force on the corresponding needle. Gas or diesel fuel pressure acts on downwardly-facing thrust surfaces of the respective needles to generate an upward (opening) force on the needle. When the pressure of the control fluid in a control chamber is relatively high, the downward force is greater than the upward force and the respective needle remains seated, and when the pressure of the control fluid is relatively low, the upward force overcomes the downward force and the respective needle opens to permit fuel injection through the respective set of outlets.

Each control chamber is connected to a source of control fluid at relatively high pressure. Each control valve is operable to connect the respective control chamber to a low-pressure drain for the control fluid. In this way, opening of each control valve causes a reduction in the pressure of the control fluid in the corresponding control chamber, resulting in opening of the corresponding valve needle.

The injector is mounted in a bore in the cylinder head of the engine. A main body of the injector extends through the bore, so that the tip of the injector protrudes into the respective combustion chamber. The maximum diameter of the cylinder head bore, and hence the diameter of the main body of the injector, is constrained by the limited space available in the cylinder head. The electromagnetic actuators used to actuate the control valves are generally too large to be accommodated in the main body of the injector. Instead, the actuators and control valves are typically mounted in a side-by-side configuration at the top of the fuel injector, so that they protrude above the cylinder head.

Injectors of this type therefore have a relatively bulky top end, which takes up space in the region above the cylinder head. Furthermore, the injectors must be supplied with two fuels from two independent fuel supply systems. Most conveniently, both fuel supply systems are mounted on top of the cylinder head. However, because some of the space above the cylinder head is reserved for the valve train of the engine and other engine components, the space available for the fuel rails, supply pipes and other components of the fuel supply systems is limited. It would therefore be desirable to provide fuel injectors and fuel injection systems in which more compact and/or more convenient fuel supply arrangements are possible.

SUMMARY OF THE INVENTION

From a first aspect, the present invention resides in a fuel injector for an internal combustion engine, the fuel injector being installable in a cylinder head bore of a cylinder head of the engine and comprising a body region arranged to be received within the cylinder head bore, and a head region arranged to extend outside the cylinder head bore to protrude from the cylinder head when the injector is installed in the cylinder head bore. The fuel injector further comprises a first valve needle arranged to control the injection of a gaseous fuel from a first outlet, a second valve needle arranged to control the injection of a liquid fuel from a second outlet, a gaseous fuel inlet for admitting the gaseous fuel to the injector, and a liquid fuel inlet for admitting the liquid fuel to the injector. The gaseous fuel inlet is disposed in the body region of the injector, and the liquid fuel inlet is disposed in the head region of the injector.

In this way, the fuel injector can be supplied with gaseous fuel from a suitable gaseous fuel supply means disposed within the cylinder head of the engine. Only the liquid fuel supply means need be located in the space above the cylinder head, leaving more room for other engine components such as the engine valve train.

The liquid fuel is preferably diesel. The gaseous fuel may be natural gas or a different combustion gas.

The fuel injector may comprise first and second control valves for controlling the movement of the first and second valve needles, respectively. Preferably, the first and second control valves are housed within the body region of the injector. By housing the control valves in the body region of the injector, instead of at the top end of the injector, further room is created for other engine components in the space above the cylinder head.

The first and second control valves may comprise solenoid valves. In one particularly compact arrangement, the first and second control valves share a common core member. Preferably, the first and second control valves are hydraulically balanced valves. Advantageously, the use of hydraulically balanced valves minimises the size of the actuators and biasing springs associated with the valves, which helps to reduce further the space occupied by the control valves within the body region of the injector. The liquid fuel is preferably used as a control fluid for the first and second control valves.

The injector may comprise a cap nut which extends, at least in part, along the body region of the injector. The gaseous fuel inlet may comprise one or more apertures in the cap nut.

In one embodiment, the fuel injector further comprises an accumulator volume for the liquid fuel, and a liquid fuel outlet in fluid communication with the accumulator volume. With this configuration, it is not necessary to provide an external accumulator volume for the liquid fuel (for example in the form of a fuel rail mounted on top of the cylinder head). Therefore, by including an internal accumulator volume for the liquid fuel in the fuel injector, the space above the cylinder head that is occupied by components associated with the supply of liquid fuel to the injector is reduced.

The accumulator volume may be disposed, at least in part, in the head region of the injector. For example, the accumulator volume may extend into the head region from a top end of the injector. Preferably, the liquid fuel outlet is disposed in the head region of the injector.

In one embodiment, the accumulator volume is defined, in part, by a generally cylindrical wall, and the fuel injector further comprises an inlet passage that connects with the accumulator volume at the wall and communicates with the liquid fuel inlet.

In a second aspect, the invention extends to an internal combustion engine comprising a cylinder head having one or more cylinder head bores, and a fuel injection system comprising one or more fuel injectors according to the first aspect of the invention. The or each fuel injector is mountable in a respective cylinder head bore. The fuel injection system preferably includes a liquid fuel accumulator volume disposed outside the cylinder head and connected to the liquid fuel inlet of the or each injector, and gaseous fuel supply means disposed within the cylinder head to supply gaseous fuel to the gaseous fuel inlet of the or each injector.

In one example, the liquid fuel accumulator volume comprises a fuel rail arranged to receive liquid fuel from a high-pressure fuel pump. The fuel rail is preferably mounted on a top face of the cylinder head.

In a third aspect, the invention resides in an internal combustion engine comprising a cylinder head having a plurality of cylinder head bores, and a fuel injection system comprising first and second fuel injectors, each fuel injector being in accordance with the first aspect of the invention and mountable in a respective cylinder head bore. Each injector has an accumulator volume for the liquid fuel, and a liquid fuel outlet in fluid communication with the accumulator volume. The fuel injection system also includes gaseous fuel supply means disposed within the cylinder head to supply gaseous fuel to the gaseous fuel inlet of each injector. The liquid fuel inlet of the first injector is arranged to receive liquid fuel from a high-pressure fuel pump, and the liquid fuel outlet of the first injector is connected to the liquid fuel inlet of the second injector.

In this way, the first and second fuel injectors are connected in series to a source of high-pressure fuel. Because the internal accumulator volumes of each injector are linked together, they provide a common accumulator volume so that a separate external fuel is not required. This simplifies the fuel injection system, reduces cost, and creates more space for other engine components.

The fuel injection system of the engine may comprise one or more further injectors of the same type. The liquid fuel inlet of each further injector may be connected to the liquid fuel outlet of another injector in series. In this way, the fuel injection system can be scaled to suit engines with differing numbers of cylinders without the need to re-design any parts.

Preferred and/or optional features of each aspect of the invention may also be used, alone or in appropriate combination, in the other aspects of the invention also.

BRIEF DESCRIPTION OF THE DRAWINGS

The present invention will now be described, by way of example only, with reference to the accompanying drawings, in which like reference numerals are used for like features, and in which.

DETAILED DESCRIPTION OF EMBODIMENTS OF THE INVENTION

Figure 1:
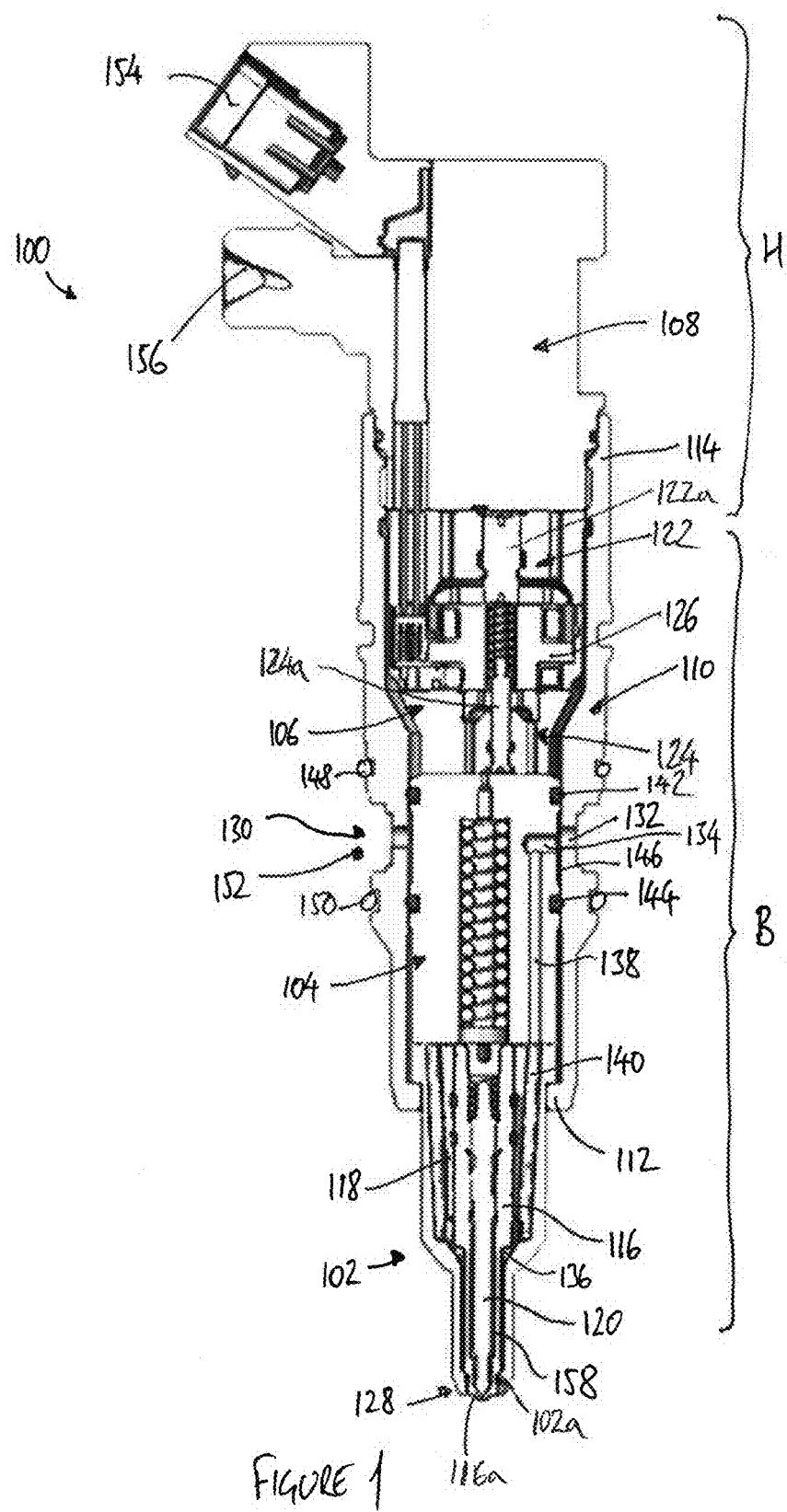
FIG. 1 is a sectional view of a fuel injector according to a first embodiment of the present invention.

FIG. 1 shows a fuel injector 100 according to a first embodiment of the present invention. The injector 100 is elongate and generally cylindrical, and comprises a nozzle body 102, a nozzle holder body 104, a control valve assembly 106 and a head part 108.

The nozzle body 102, the nozzle holder body 104 and the control valve assembly 106 are clamped to the head part 108 by means of a cap nut 110, which has an inwardly-directed flange 112 at its lower end to engage with and retain the nozzle body 102, and an internally-threaded upper region 114 to engage with an externally-threaded lower region of the head part 108.

The nozzle body 102 houses a first valve needle in the form of generally tubular outer valve needle 116 which is slidable within a guide bore 118 in the nozzle body 102, and a second valve needle in the form of an inner valve needle 120, which is slidably received within the outer valve needle 116. The outer valve needle 116 is engageable with a seating region 102a formed at a tip of the nozzle body 102 to control the injection of a gaseous fuel into a combustion chamber (not shown) of the engine. The inner valve needle 120 is engageable with a seating region 116a formed at a tip of the outer valve needle 116 to control the injection of a liquid fuel into the combustion chamber.

Movement of the outer and inner valve needles 116, 120 is controlled by a first control valve 122 and a second control valve 124, respectively. The first and second control valves 122, 124 are solenoid actuated valves that together form part of the control valve assembly 106. The control valve assembly 106 includes a common core member 126 that forms part of a solenoid actuator of each control valve 122, 124.

Each control valve 122, 124 includes a substantially hydraulically balanced control valve member 122a, 124a. This means that no significant net hydraulic force acts on the control valve members when they are in a first position. As a result, the control valve assembly 106 is relatively small in diameter, and can be accommodated within the cap nut 110.

In use, the fuel injector is mounted in a cylinder head bore in a cylinder head (not shown) of the engine. A tip region 128 of the nozzle body 102, which includes outlets for the liquid and gaseous fuels, protrudes out of the cylinder head bore on the lower face of the cylinder head so the fuels can be sprayed into the combustion chamber. The head part 108 protrudes out of the cylinder head bore on the upper face of the cylinder head.

In this way, when the injector is installed in the engine, a body region of the fuel injector, indicated generally as "B" in FIG. 1, is received within the cylinder head bore, and a head region, indicated generally as "H" in FIG. 1, extends outside the cylinder head bore to protrude from the top face of the cylinder head. The body region B includes at least part of the control valve assembly 106 and at least part of the nozzle body 102.

A gaseous fuel inlet 130 is located in the body region B of the injector. The gaseous fuel inlet 130 comprises a plurality of apertures 132 (two of which are shown in FIG. 1) in the cap nut 110. The apertures 132 are in fluid communication with a radial drilling 134 that extends inwardly from the outer wall of the nozzle holder body 104. The radial drilling 134 is in fluid communication with a storage volume 136 for gaseous fuel, by way of longitudinally-extending drillings 138, 140 in the nozzle holder body 104 and the nozzle body 102. The storage volume 136 is arranged annularly around the outer valve needle 116 in the nozzle body 102. Internal seals 142, 144 serve to contain the gaseous fuel in an annular space 146 between the nozzle holder body 104 and the cap nut 110, thereby to guard against leakage of the gaseous fuel from the injector.

An internal gaseous fuel supply means is provided in the cylinder head, to deliver gaseous fuel to the gaseous fuel inlet 130 of the injector. The gaseous fuel supply means comprises a set of passages that extend through the cylinder head to transport the gaseous fuel from an external source of gaseous fuel (for example a storage tank and a pump) to the cylinder head bores. External seals 148, 150 are provided on the injector to seal the cap nut 110 against the cylinder head bore, thereby to contain the gaseous fuel within an annular region 152 around the injector that corresponds to the position of the apertures 132.

In this way, gaseous fuel can be supplied to the injector using a gaseous fuel supply arrangement that does not occupy any space above the top face of the cylinder head.

The head part 108 of the injector comprises an electrical connector 154, to which a signal cable can be connected to convey signals to the injector from an electronic control unit in order to operate the first and second control valves 122, 124.

The head part 108 also includes a liquid fuel inlet port 156, to which a supply of high-pressure fuel can be connected. Within the injector 100, the high-pressure liquid fuel is conveyed from the liquid fuel inlet port 156 to a storage volume 158, disposed between the inner valve needle 120 and the outer valve needle 116, by a series of passages (not shown).

Connections for the liquid fuel and the electrical supply are therefore provided in the head region H of the injector, which is exposed above the top face of the cylinder head when the injector is installed in the engine.

Operation and control of the injector 100 is in accordance with principles known in the art and will not be described in detail. Briefly, the first control valve 122 is operable to control the pressure of a control fluid, in this case the liquid fuel, in a first control chamber. An upper end of the outer valve needle 116 is exposed to the fuel pressure in the first control chamber, such that when the first control valve 122 is operated to reduce the fuel pressure in the first control chamber, the outer valve needle 116 lifts from its valve seat to allow injection of the gaseous fuel. Similarly, the second control valve 124 is operable to control the liquid fuel pressure in a second control chamber. An upper end of the inner valve needle 120 is exposed to fuel pressure in the second control chamber, such that when the second control valve 124 is operated to reduce the fuel pressure in the second control chamber, the inner valve needle lifts to allow injection of the liquid fuel.

A drain connection for liquid fuel (not shown) may also be provided in the body region B of the injector. The drain connection is connected to a low-pressure drain by way of suitable passages in the cylinder head.

Figure 2:
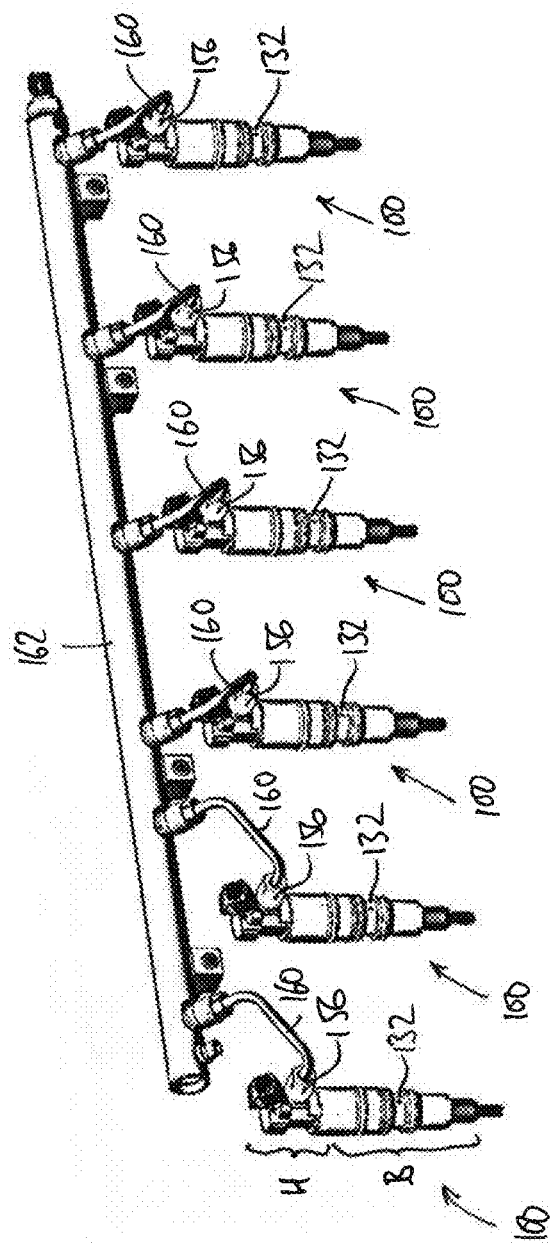
FIG. 2 is a perspective view of part of a fuel injection system incorporating a plurality of fuel injectors of the type shown in FIG. 1.

FIG. 2 shows six fuel injectors 100 of the type shown in FIG. 1 as they would be installed in a cylinder head (not shown) of a six-cylinder internal combustion engine. One injector 100 is provided for each cylinder of the engine.

The liquid fuel inlet 156 of each injector 100 is connected, by way of a respective fuel pipe 160, to a linear fuel rail 162. The fuel rail 162 is tubular to define an internal volume that provides an accumulator volume for the liquid fuel. By providing an accumulator volume, pressure fluctuations in the liquid fuel supply to each injector due to pumping events and injection events can be significantly reduced. The liquid fuel is supplied to the fuel rail 162 by a fuel pump (not shown). The fuel rail 162 and the fuel pipes 160 are mounted on top of the cylinder head.

In the arrangement of FIG. 2, only the liquid fuel supply system intrudes into the space above the cylinder head. However, the fuel rail 162 still occupies a relatively large amount of space.

As will now be described, the space occupied by the liquid fuel supply system can be reduced further by replacing the external accumulator volume for the liquid fuel that is provided by the fuel rail 162 in the arrangement of FIG. 2 with an accumulator volume for the liquid fuel that is distributed internally between the injectors.

Figure 3:
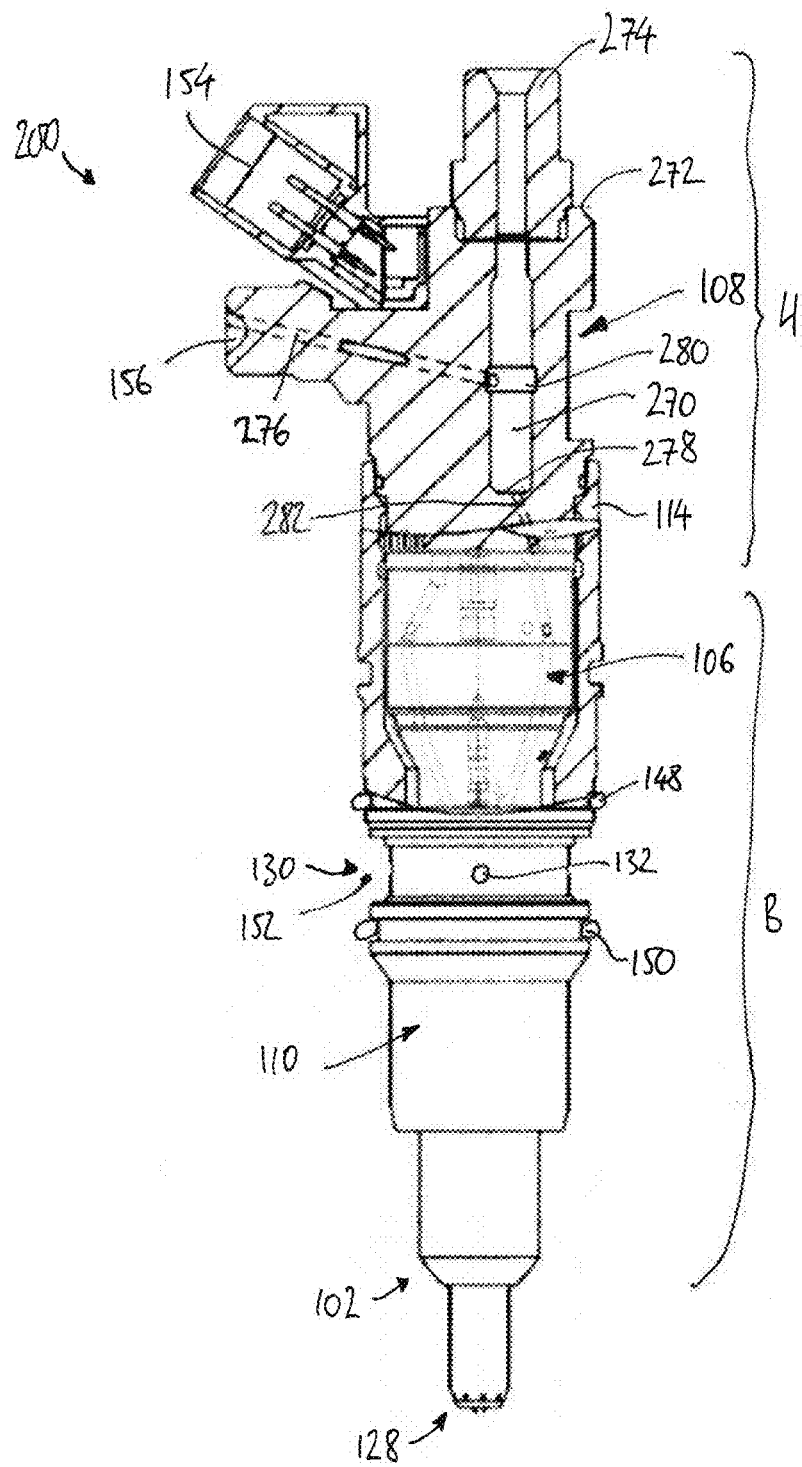
FIG. 3 a part-sectional view of a fuel injector according to another embodiment of the present invention.

FIG. 3 shows a fuel injector 200 according to a second embodiment of the invention. The injector 200 of FIG. 3 is similar in many respects to the injector 100 of FIG. 1, and only the differences will be described in detail. Reference should be made to the above description for an explanation of features not explicitly referred to below.

In the injector 200 of the second embodiment of the invention, the head part 108 includes an accumulator volume for the liquid fuel, in the form of a generally cylindrical chamber 270 that extends from a top end 272 of the head part 108. The upper end of the chamber 270 connects with an outlet port 274 for high-pressure liquid fuel.

An inlet passage 276 extends from the liquid fuel inlet port 156 to connect with the chamber 270. The inlet passage 276 connects with the cylindrical wall of the chamber 270 at a position that is intermediate between the outlet port 274 at the upper end of the chamber 270 and the lower end 278 of the chamber 270. An annular groove 280 is formed in the wall of the chamber 270 where the inlet passage 276 intersects the wall, so as to reduce stresses at the intersection.

Liquid fuel is delivered to the control valve assembly 106 and the nozzle body 102 of the injector 200 by way of a series of passages, including a passage 282 that connects with the lower end 278 of the chamber 270 to carry high-pressure liquid fuel towards the control valve assembly 106 and the nozzle body 102.

Figure 4:
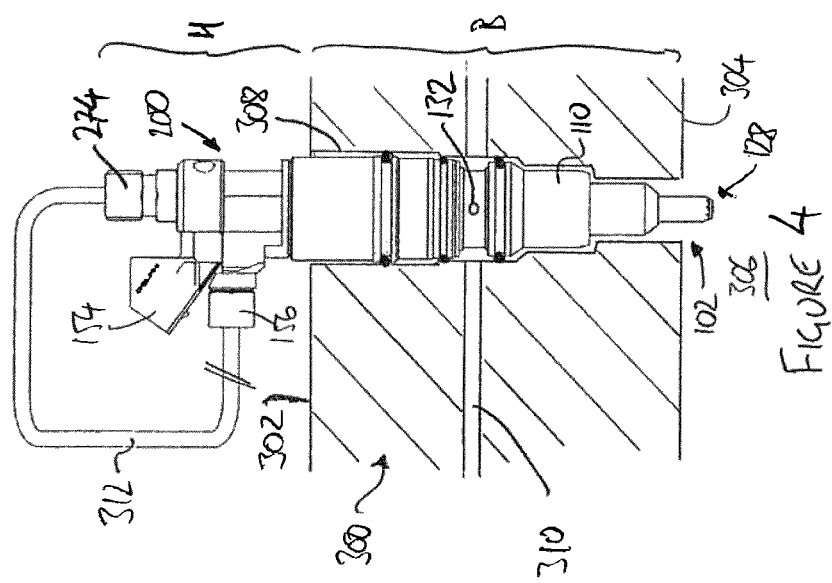
FIG. 4 is a part-sectional side view of the fuel injector of FIG. 3 installed in a cylinder head of an internal combustion engine.

FIG. 4 shows the injector 200 of FIG. 3 installed in a cylinder head 300 of an internal combustion engine. The cylinder head 300 includes an upper face 302, above which the head region H of the injector 200 is exposed, and a lower face 304, which defines, in part, a combustion chamber 306 of the engine. The tip region 128 of the nozzle body 102 protrudes into the combustion chamber 306.

The body portion B of the injector 200 is housed within a cylinder head bore 308. Gaseous fuel supply passages 310 extend through the cylinder head 300, parallel to the top face 302, to supply gaseous fuel to the injector 200 by way of the aperture 132 in the cap nut 110.

As will be explained in more detail below, the liquid fuel outlet port 274 of the injector 200 is connected to the liquid fuel inlet port of an adjacent injector (not visible in FIG. 4), by way of a fuel pipe 312. The outlet port 274 extends generally perpendicular to the upper face 302 of the cylinder head, and parallel to the elongate axis of the injector 200, and the liquid fuel inlet port 156 extends generally parallel to the upper face 302 of the cylinder head and perpendicular to the elongate axis of the injector 200.

Figure 5:
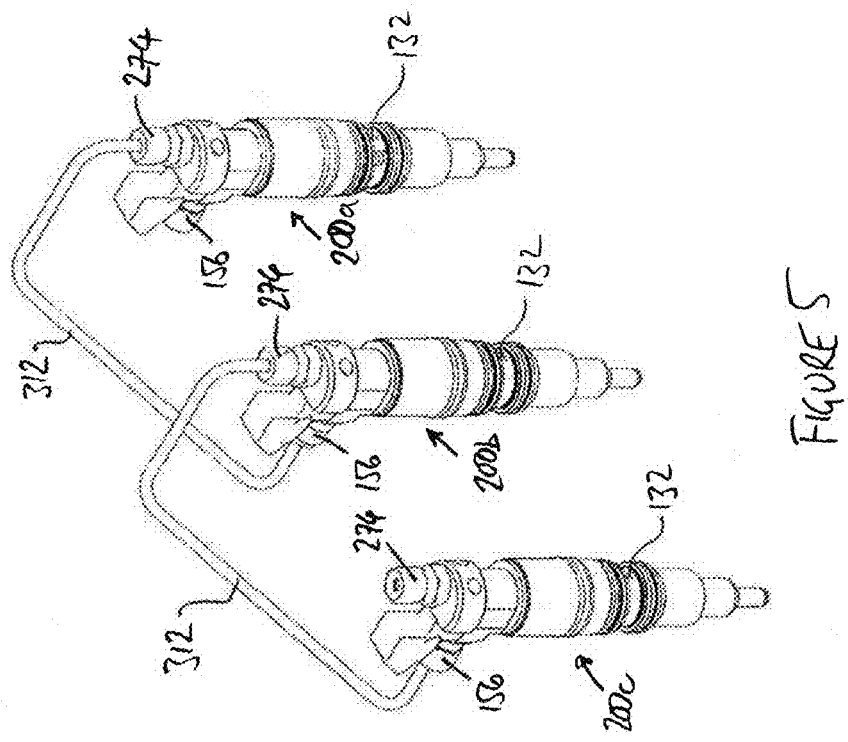
FIG. 5 is a perspective view of part of a fuel injection system incorporating a plurality of fuel injectors of the type shown in FIG. 3.

FIG. 5 shows first, second and third fuel injectors 200a, 200b, 200c of the type shown in FIG. 3 as they would be installed in a cylinder head (not shown) of an internal combustion engine. One injector 200a, 200b, 200c is provided for each cylinder of the engine. It will be appreciated that, although three injector are shown in FIG. 5, fewer or more cylinders and associated injectors could be provided.

The liquid fuel inlet port 156 of the first injector 200a is connected to a high-pressure liquid fuel pump (not shown), so that the accumulator volume in the first injector 200a is filled with high-pressure liquid fuel. The liquid fuel outlet port 274 of the first injector 200a is connected to the liquid fuel inlet port 156 of the adjacent second injector 200b by way of a fuel pipe 310. In this way, high-pressure fuel flows from the accumulator volume in the second injector 200b is also filled with high-pressure liquid fuel.

In turn, the liquid fuel outlet port 274 of the second injector 200b is connected to the liquid fuel inlet port 156 of the third injector 200c by another fuel pipe 310. Further injectors may be connected in series in this way, so that high-pressure liquid fuel is distributed to all of the injectors. The liquid fuel outlet port 274 of the final injector in the series can be closed and sealed by a blanking plug or similar device.

The internal accumulator volumes formed by the chambers 270 provided within each injector together have a similar hydraulic effect to the external fuel rail 162 of the arrangement of FIG. 2. However as will be appreciated from FIGS. 4 and 5, the space occupied by the liquid fuel supply system above the cylinder head 300 is significantly reduced by the use of internal accumulator volumes.

It will be appreciated that the fuel injector of FIG. 3 could also conceivably be used with an external fuel rail, to provide an additional accumulator volume.

The fuel injector of FIG. 1 could be installed in the cylinder head shown in FIG. 4.

Further modifications and variations not explicitly described above could also be contemplated by a person skilled in the art without departing from the scope of the invention as defined in the appended claims.

The invention claimed is:

1. A fuel injector for an internal combustion engine, the fuel injector comprising:
   a body region arranged to be received within a bore of a cylinder head of an engine;
   a head region arranged to extend outside the bore of the cylinder head and protrude from the cylinder head when the fuel injector is installed in the bore of the cylinder head;
   a first valve needle arranged to control injection of a gaseous fuel from a first outlet;
   a second valve needle slidably received within the first valve needle and arranged to control injection of a liquid fuel from a second outlet, wherein the injection of the gaseous fuel is independent of injection of the liquid fuel;
   a gaseous fuel inlet disposed in the body region of the fuel injector for admitting the gaseous fuel to the fuel injector; and
   a liquid fuel inlet port disposed in the head region of the fuel injector for admitting the liquid fuel to the fuel injector.

2. The fuel injector according to claim 1, wherein the fuel injector comprises first and second control valves for controlling movement of the first and second valve needles respectively, and wherein the first and second control valves are housed within the body region of the fuel injector.

3. The fuel injector according to claim 2, wherein the first and second control valves comprise solenoid valves that share a common core member.

4. The fuel injector according to claim 2, wherein the first and second control valves are hydraulically balanced valves.

5. The fuel injector according to claim 1, further comprising a cap nut which extends, at least in part, along the body region of the fuel injector, and wherein the gaseous fuel inlet comprises one or more apertures passing through the cap nut.

6. The fuel injector according to claim 1, further comprising: an accumulator volume for the liquid fuel; and
   a liquid fuel outlet port in fluid communication with the accumulator volume.

7. The fuel injector according to claim 6, wherein the accumulator volume is disposed, at least in part, in the head region of the fuel injector.

8. The fuel injector according to claim 7, wherein the accumulator volume extends into the head region from a top end of the fuel injector.

9. The fuel injector according to claim 6, wherein the accumulator volume is defined, in part, by a generally cylindrical wall, and wherein the fuel injector further comprises an inlet passage that connects with the accumulator volume at the wall and communicates with the liquid fuel inlet.

10. The fuel injector according to claim 1, wherein injection of the liquid fuel is a pilot injection to initiate combustion of the gaseous fuel in a combustion chamber of the internal combustion engine.

11. An internal combustion engine comprising a cylinder head having one or more cylinder head bores and a fuel injection system, the fuel injection system comprising:
   one or more fuel injectors, the or each fuel injector being mountable in a respective cylinder head bore and each fuel injector including: a body region arranged to be received within the cylinder head bore, and a head region arranged to extend outside the cylinder head bore and protrude from the cylinder head when the injector is installed in the cylinder head bore;

a first valve needle arranged to control injection of a gaseous fuel from a first outlet;

a second valve needle slidably received within the first valve needle and arranged to control injection of a liquid fuel from a second outlet, wherein the injection of the gaseous fuel is independent of injection of the liquid fuel;

a gaseous fuel inlet disposed in the body region of the fuel injector for admitting the gaseous fuel to the fuel injector; and a liquid fuel inlet port disposed in the head region of the fuel injector for admitting the liquid fuel to the fuel injector;

a liquid fuel accumulator volume disposed outside the cylinder head and connected to the liquid fuel inlet port of the or each fuel injector; and gaseous fuel supply means disposed within the cylinder head to supply gaseous fuel to the gaseous fuel inlet of the or each fuel injector.

12. The internal combustion engine according to claim 11, wherein the liquid fuel accumulator volume comprises a fuel rail arranged to receive liquid fuel from a high-pressure fuel pump.

13. The internal combustion engine according to claim 11, wherein the or each fuel injector comprises first and second control valves for controlling movement of the first and second valve needles respectively, and wherein the first and second control valves are housed within the body region of the fuel injector.

14. The internal combustion engine according to claim 13, wherein the first and second control valves comprise solenoid valves that share a common core member.

15. The internal combustion engine according to claim 13, wherein the first and second control valves are hydraulically balanced valves.

16. The internal combustion engine according to claim 13, wherein the injection of the liquid fuel from the second outlet is a pilot injection to initiate combustion of the gaseous fuel in a combustion chamber of the internal combustion engine.

17. The fuel injector according to claim 2, wherein injection of the liquid fuel is a pilot injection to initiate combustion of the gaseous fuel in a combustion chamber of the internal combustion engine.

18. The fuel injector according to claim 4, wherein injection of the liquid fuel is a pilot injection to initiate combustion of the gaseous fuel in a combustion chamber of the internal combustion engine.

19. The fuel injector according to claim 2, wherein the liquid fuel inlet port is above the first and second control valves.

20. The internal combustion engine according to claim 13, wherein the liquid fuel inlet port is above the first and second control valves.

* * * * *